United States Patent
DeBenedictis et al.

(10) Patent No.: US 12,146,107 B2
(45) Date of Patent: Nov. 19, 2024

(54) LIQUID-SOLID SEPARATION SYSTEMS FOR PROCESSING ORGANIC POLYMERIC MATERIALS

(71) Applicant: Alterra Energy, LLC, Akron, OH (US)

(72) Inventors: Jeremy J. DeBenedictis, Macedonia, OH (US); Stanley G. Prybyla, Brecksville, OH (US); Dominic O. Rosace, Sagamore Hills, OH (US); Scott M. Sass, Medina, OH (US); Nicholas A. VanSuch, Mogadore, OH (US)

( * ) Notice: Subject to any disclaimer, the term of this patent is extended or adjusted under 35 U.S.C. 154(b) by 0 days.

(21) Appl. No.: 17/879,458

(22) Filed: Aug. 2, 2022

(65) Prior Publication Data

US 2022/0372376 A1 Nov. 24, 2022

Related U.S. Application Data

(63) Continuation of application No. PCT/US2021/045787, filed on Aug. 12, 2021.

(60) Provisional application No. 63/193,669, filed on May 27, 2021, provisional application No. 63/157,414, filed on Mar. 5, 2021, provisional application No. 63/157,316, filed on Mar. 5, 2021, provisional application No. 63/157,391, filed on Mar. 5, 2021, provisional application No. 63/157,371, filed on Mar. 5, 2021.

(51) Int. Cl.
| | |
|---|---|
| *C10G 1/10* | (2006.01) |
| *B01D 5/00* | (2006.01) |
| *B01D 17/02* | (2006.01) |
| *B01J 6/00* | (2006.01) |
| *C10G 1/00* | (2006.01) |

(52) U.S. Cl.
CPC ............. *C10G 1/10* (2013.01); *B01D 5/0027* (2013.01); *B01D 5/0036* (2013.01); *B01D 17/0217* (2013.01); *B01J 6/00* (2013.01); *C10G 1/002* (2013.01); *C10G 2300/1003* (2013.01)

(58) Field of Classification Search
CPC . B01D 5/0027; B01D 5/0036; B01D 17/0217
See application file for complete search history.

(56) References Cited

U.S. PATENT DOCUMENTS

| | | | |
|---|---|---|---|
| 3,408,083 A | 10/1968 | Szymanski | |
| 3,724,887 A | 4/1973 | Roberts | |
| 4,014,643 A | 3/1977 | Musha et al. | |
| 4,199,154 A | 4/1980 | Mueller | |
| 4,260,473 A * | 4/1981 | Bauer | C10G 1/045 |
| | | | 201/2.5 |
| 4,406,464 A | 9/1983 | Schymura | |
| 5,090,610 A | 2/1992 | Bernt et al. | |
| 5,551,870 A | 9/1996 | Gale | |
| 5,595,349 A | 1/1997 | Bergstrom et al. | |
| 6,178,899 B1 | 1/2001 | Kaneko et al. | |
| 7,087,140 B1 | 8/2006 | Menian | |
| 7,101,463 B1 | 9/2006 | Weinecke et al. | |
| 11,180,699 B1 | 11/2021 | Bingham | |
| 2012/0063965 A1 * | 3/2012 | Coates | B08B 9/0436 |
| | | | 422/164 |
| 2012/0317871 A1 | 12/2012 | Frey et al. | |
| 2016/0017232 A1 | 1/2016 | Ullom | |
| 2016/0024390 A1 | 1/2016 | Ullom | |
| 2017/0073584 A1 | 3/2017 | Bordynuik | |
| 2017/0114279 A1 | 4/2017 | Alyaser | |
| 2021/0179954 A1 | 6/2021 | Coleman et al. | |
| 2022/0251392 A1 * | 8/2022 | Ruiz Herrera | C09C 1/482 |

FOREIGN PATENT DOCUMENTS

| | | | | |
|---|---|---|---|---|
| CN | 105327550 A | | 2/2016 | |
| DE | 1280475 B | | 10/1968 | |
| DE | 4334544 A1 | | 4/1995 | |
| EP | 0035652 A1 | | 9/1981 | |
| JP | 2006-002088 A | | 1/2006 | |
| WO | WO-2020260730 A1 * | | 12/2020 | ............... B01D 3/06 |
| WO | WO 2021/027698 A1 | | 2/2021 | |

OTHER PUBLICATIONS

International Patent Application No. PCT/US2021/045787; Int'l Search Report and the Written Opinion; dated Mar. 18, 2022; 33 pages.
International Patent Application No. PCT/US2021/045787; Int'l Preliminary Report on Patentability; dated Sep. 14, 2023; 25 pages.

* cited by examiner

*Primary Examiner* — Randy Boyer
(74) *Attorney, Agent, or Firm* — BakerHostetler

(57) ABSTRACT

Provided are systems and related methods for processing organic polymeric feed materials—such as plastics—to form pyrolysis oil. The disclosed systems can be operated in a continuous manner and utilize novel liquid-solid separation techniques integrated with a novel condensing approach so as to operate in a product-efficient and an energy-efficient manner.

10 Claims, 3 Drawing Sheets

LIQUID-SOLID SEPARATION SYSTEMS FOR PROCESSING ORGANIC POLYMERIC MATERIALS

RELATED APPLICATIONS

The present application is a continuation of international patent application no. PCT/US2021/045787, "Thermal Cracking of Organic Polymeric Materials With Gas-Liquid and Liquid-Solid Separation Systems" (filed Aug. 12, 2021); which application claims priority to and the benefit of U.S. patent application No. 63/157,316, "Organic Polymeric Materials Processing And Related Product Separation" (filed Mar. 5, 2021), U.S. patent application No. 63/157,371, "Thermal Cracking Systems For Processing Organic Polymeric Materials" (filed Mar. 5, 2021), U.S. patent application no. 63/157,391, "Condenser Systems For Processing Organic Polymeric Materials" (filed Mar. 5, 2021), U.S. patent application No. 63/157,414, "Liquid-Solid Separation Systems For Processing Organic Polymeric Materials" (Tiled Mar. 5, 2021), and U.S. patent application No. 63/193,669, "Lance Seal Assemblies and Related Methods" (filed May 27, 2021). The entireties of the foregoing applications are incorporated herein by reference for any and all purposes.

TECHNICAL FIELD

The present disclosure relates to the field of processing organic polymeric materials to form hydrocarbonaceous products and also to the fields of gas-liquid and solid-liquid separation.

BACKGROUND

Although there is considerable industrial interest in conversion of polymer waste to condensable, non-condensable, and solid hydrocarbon products, existing methods of doing so exhibit a number of inefficiencies and disadvantages. In particular, existing methods exhibit an inability to operate continuously, and their inability to operate continuously often relates to the existing methods' inability to efficiently handle solid product (e.g., char) that is produced in such methods. Accordingly, there is a long-felt need in the art for improved methods of converting polymer waste to condensable, non-condensable, and solid hydrocarbon products.

SUMMARY

In meeting the described long-felt needs, the present disclosure provides, inter alia, a system for conversion of organic polymeric material to hydrocarbonaceous materials, comprising: a thermal cracking train, the thermal cracking train configured to effect molecular cracking of a polymeric material fed to the thermal cracking train; a condensing train, the condensing train configured to receive a thermal cracking product from the thermal cracking train and condense at least a portion of the thermal cracking product to give rise to a pyrolysis oil product from the thermal cracking product; and a separating train, the separating train configured to receive from the condensing train a first liquid comprising a solid material and the pyrolysis oil product, the separating train being configured to separate at least some of the pyrolysis oil product from the first liquid.

Also provided is a method, comprising operating a system according to the present disclosure (e.g., according to any one of Aspects 1-12) so as to convert a polymeric material to a char, a gas, and a pyrolysis oil product, the method optionally being performed continuously.

Further disclosed is a method, comprising: effecting thermal cracking of a polymeric material so as to give rise to a thermal cracking product and a char; optionally devolatilizing and collecting at least some of the char; condensing at least a portion of the thermal cracking product so as to give rise to (1) a first liquid comprising at least some of the char and a pyrolysis oil product, and (2) a first overhead comprising at least some of the pyrolysis oil product; separating at least some of the pyrolysis oil product from the first liquid; condensing a portion of the first overhead so as to give rise to (1) a second liquid comprising the pyrolysis oil product and (2) a second overhead; and collecting the second liquid.

Additionally provided is a thermal cracking treatment train, comprising: a rotatable kiln reactor; the rotatable kiln reactor being configured to receive an organic polymeric feed material, the rotatable kiln reactor defining at least one interior wall that bounds an interior volume of the rotatable kiln reactor, the interior volume defining an entrance and an exit along a direction of the organic polymeric feed material travel, the rotatable kiln reactor comprising a section that comprises one or more sweeping features configured to sweep, with rotation of the kiln, a portion of the at least one interior wall, the rotatable kiln reactor comprising a section that comprises one or more lifter features extending from the at least one interior wall and configured to, with rotation of the rotatable kiln reactor, encourage material disposed on the one or more features to fall into the interior volume of the interior of the rotatable kiln reactor; a combustor configured to provide a heated gas to the rotatable kiln reactor, the combustor optionally configured to receive and combust a non-condensed hydrocarbonaceous vapor; and a devolatilization train, the devolatilization train optionally comprising a first valve, a holding chamber, and a second valve, the first valve configured to interrupt fluid communication between the interior volume of the rotatable kiln reactor and the holding chamber, and, the second valve being configured to interrupt fluid communication between the holding chamber and an environment exterior to the holding chamber.

Further provided is a method, comprising: operating a thermal cracking train according to the present disclosure (e.g., according to any one of Aspects 22-37) so as to give rise to a thermal cracking product and a char, optionally devolatilizing and collecting at least some of the char, and optionally communicating the cracking product to one or more condensers.

Also disclosed is a method, comprising: effecting communication of an organic polymeric feed material within a rotatable kiln reactor having at least one interior wall, the organic polymeric feed material being exposed to two or more zones of different temperature within the rotatable kiln reactor, at least one of the two different temperature zones giving effecting thermal cracking of the organic polymeric feed material to (1) a thermal cracking product that comprises a pyrolysis oil product and (2) a char; at least partially devolatilizing the char to give rise to a first devolatilized char; collecting at least some of the first devolatilized char in a holding chamber; optionally interrupting fluid communication between the holding chamber and the rotatable kiln reactor; further devolatilizing the at least some of the first devolatilized char in the holding chamber to give rise to a second devolatilized char; collecting the second devolatilized char.

Additionally provided is a condensation train, comprising: a first condenser configured to condense, from a feed vapor provided to the first condenser, a first liquid that comprises a pyrolysis oil product, the first condenser optionally configured as a spray down condenser; a second condenser in fluid communication with the first condenser, the second condenser configured to receive a first overhead from the first condenser, the second condenser being configured to condense, from the first overhead, a second liquid that comprises the pyrolysis oil product; and optionally a third condenser in fluid communication with the second condenser, the third condenser configured to receive a second overhead from the second condenser, the third condenser configured to condense, from the second overhead, a third liquid comprising pyrolysis oil product.

Further provided is a method, comprising: communicating, to a first condenser, a feed that includes a vapor comprising a pyrolysis oil product, the first condenser optionally being a spray down condenser; operating the first condenser so as to give rise to a first liquid that comprises the pyrolysis oil product and a first overhead that comprises the pyrolysis oil product; recycling to the first condenser at least some of the first liquid; communicating the first overhead to a second condenser; operating the second condenser so as to give rise to a second liquid that comprises the pyrolysis oil product and a second overhead that comprises the pyrolysis oil product; communicating the second overhead to a third condenser; and operating the third condenser so as to give rise to a third liquid that comprises the pyrolysis oil product and to a third overhead that comprises noncondensed species.

Also disclosed is a separations train, comprising: a separation module, the separation module being configured to receive, optionally from a condenser, a feed material comprising a char and a pyrolysis oil product, the separation module being operable to separate the char and the pyrolysis oil from one another; a receiving line configured to receive pyrolysis oil product from the separation module.

Further provided is a solid-liquid separations method, comprising: introducing, to a separation module, a feed comprising a pyrolysis oil product and a char, with the separation module, effecting separation of the pyrolysis oil product and the char fluid from one another; collecting the char; and collecting at least some of the pyrolysis oil product.

The present disclosure also provides operations units, comprising: a first chamber; a second chamber; a conduit extending through the first chamber and into the second chamber, the conduit being at least partially enclosed by a conduit jacket, the conduit jacket defining an outer diameter, the conduit placing the second chamber into fluid communication with an environment exterior to the chamber, the second chamber comprising a wall facing the conduit jacket, and the second chamber being rotatable relative to the first chamber; a seal defining a boundary between the first chamber and the second chamber, the seal extending radially from the wall of the second chamber toward the conduit jacket, the seal comprising a first flange secured to and extending from the wall of the second chamber, the first flange defining an inner diameter, (a) the seal comprising a layered portion that comprises a plurality of ring-shaped portions, at least one of the ring-shaped portions having an inner diameter less than the outer diameter of the conduit jacket such that the at least one of the ring-shaped portions rotatably abuts the conduit jacket, the outer diameter of the conduit jacket optionally no more than about 1.25 cm larger than the inner diameter of the at least one of the ring-shaped portions, or (b) the seal comprising a brush that rotatably abuts the conduit jacket.

Also provided are related methods of using the disclosed operations units.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

Figure 1:
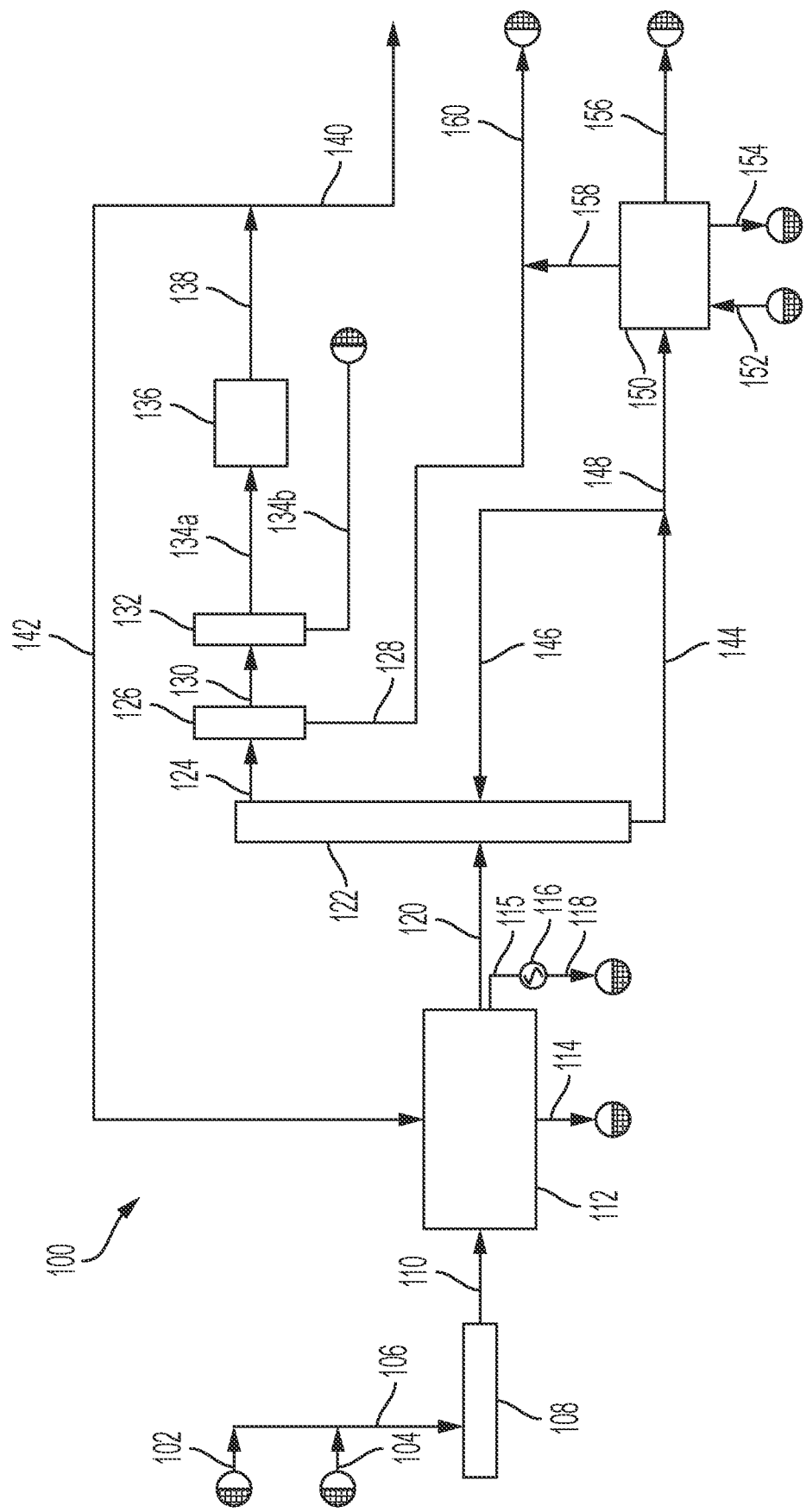
FIG. 1 provides a depiction of an example system according to the present disclosure.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate"

whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "from 2 grams to 10 grams, and all the intermediate values" includes 2 grams, 10 grams, and all intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

Polymer Processing and Hydrocarbon Products

Condensable hydrocarbon products include, e.g., synthetic petroleum and a variety of its fractions, including but not limited to light sweet crude oil, fuel additives, base oil, slack wax, paraffin wax, microcrystalline wax and condensate dominated by aromatic petroleum hydrocarbons. The non-condensable hydrocarbon product is a gas. Solid hydrocarbon products include finely divided carbon char.

Converting waste polymers (e.g., plastics) to obtain useful end products via pyrolysis has been sought for many years. Existing approaches for doing so typically rely on batch, semi-batch or serial batch processes that are limited by their complexity and their inability to operate in a continuous manner without fouling. Some have attempted to solve this unmet need by employing a serial batch process that includes a series of batch reactors progressively operated in a set sequence, but this approach nonetheless has inefficiencies and requires constant attention from the operator.

Polymer conversion processes include the primary processes of chemical depolymerization, gasification with partial oxidation, and thermal cracking, including pyrolysis, either with or without catalytic cracking and reforming, as well as the secondary process of hydrogenation.

Chemical depolymerization has mainly been limited to decomposition of polyesters e.g. PET, and polyurethanes, with secondary application to polyamides, polycarbonates and polyacetals. This method is generally restricted to decomposition of condensation polymers, targeting monomer yield.

Gasification and partial oxidation of waste polymers typically targets production of mixtures of carbon monoxide and hydrogen generally known as syngas. Although partial oxidation can be a more efficient process than steam methane reformation in terms of reactor size and process rate, partial oxidation produces a lower comparative hydrogen yield. Little, if any, condensable hydrocarbon is produced.

Thermal cracking processes employ thermal decomposition resulting in complex mixtures. Reaction temperature, coupled with molecular retention times within respective desired temperature ranges, is the most significant reaction variable, influencing both polymer conversion and molecular distribution of conversion products. Accordingly, efficient control of reaction temperature and residence times is useful to maximize yield of the desired product mix. Batch, semi-batch and serial batch processes experience difficulty in efficiently achieving and maintaining control of reaction temperatures and residence times due to problems resulting from, among other things, inefficient heat transfer through the waste polymer as this polymer appears to exhibit poor thermal conductivity. Unlike continuous processes, which achieve a dynamic process equilibrium thereby maintaining control of reaction temperatures and residence times, batch, semi-batch and serial batch processes are continually in a state of disequilibrium, posing chronic control challenges with every process cycle and acute problems of reactor fouling. Other variables, including catalysts, are optimizers; although catalytic cracking and reforming offers advantages of polymer breakdown at lower temperatures and higher rate with added control on product quality, catalytic cracking poses challenges including process complexity, deposition of residues hindering activity, poisoning of catalysts, high capital and operating cost of catalyst reactors, and cost of disposal of spent catalyst.

Hydrogenation is a basic step in petroleum refining and petrochemical production that has been applied to secondary processing of oil resulting from thermal cracking processes. This secondary method, often coupled with distillation, is employed in the production of petroleum-based fuels and process cuts where hydrogen saturation of olefins and removal of heteroatoms is required. The term "heteroatom" is understood to mean any atom that is not carbon or hydrogen, and has been applied to indicate that non-carbon atoms have replaced carbon in the backbone of the molecular structure or replaced hydrogen or alkyl groups bonded to the backbone of the molecular structure. Typical heteroatoms are nitrogen, oxygen, sulfur, phosphorus, chlorine, bromine, fluorine and iodine. Hydrogenation is a secondary process deployed in petroleum refining and petrochemical production. Hydrogenation is capital-intensive, and can have high operating cost attributed to high pressure operation, cost of hydrogen, cost of removing waste heat, and other factors.

Existing systems have not achieved wide acceptance or success involving pyrolytic decomposition of polymers and this has been attributed to high operating costs, to the systems' inability to consistently process contaminated waste streams and waste streams of varying composition, the prohibitively high cost or lack of market availability of uncontaminated raw material streams, inability to reliably and efficiently control temperature and pressure process conditions, inability to consistently supply adequate quantities of in-specification raw material to plants requiring high volumes of material to sustain operations, inability to control system fouling by char, terephthalic acid, benzoic acid, minerals, metals and the like, attempts to produce fuel having comparatively narrow ranges of market-driven specifications from widely varying raw material compositions, inability to control heteroatom content of product oil thus limiting market acceptance of the products, inability to consistently and effectively manage safety issues attributed to worker exposure to hazardous vapors and solids in every batch reactor cycle, and generation of hazardous waste including but not limited to char, waste water and off-specification hydrocarbonaceous liquids.

More specifically, batch or semi-batch processes must overcome challenges of thermal inefficiency to promote conversion. Given that polymer waste has poor thermal conductivity, batch reactor systems often rely on some configuration of mixing elements within the reactor or complex arrays of raw material-containing cartridges placed into the batch reactor or concentric tubular devices containing raw material subjected to thermal energy or tubular heat transfer geometries deployed within the body of the batch reactor and the like, with the intent to increase raw material surface area, thereby increasing surface exposure to thermal energy which is otherwise poorly conveyed through material having poor thermal conductivity. Complex mechanical and/or geometric solutions to the limitations are inherent to batch reactors.

Additionally, most if not all batch reactors, whether singly or in series, must be charged with hydrocarbonaceous raw materials, purged of atmospheric air containing oxygen, heated to the desired temperature when product vapors are extracted, then cooled to a temperature below flash point of the residual solids to facilitate their removal. The repeated thermal cycles experienced by these systems have poor thermal efficiency, which in turn results in overconsumption of energy to complete the polymer conversion. The presently disclosed technology seeks to address, at least in part, the shortcomings of the existing approaches.

FIGURES

The following description of the appended figures is illustrative only and does not limit the scope of the present disclosure or the appended claims.

FIG. 1 provides a depiction of an exemplary system 100 according to the present disclosure. For the reader's convenience, the element labels for FIG. 1 are provided below.

100—System
102—Feedstock (e.g., organic polymeric material)
104—Additive (optional; can be, e.g., oxides, hydroxides, and/or carbonates of Group 1; oxides, hydroxides, and/or carbonates of Group 2; and/or oxides, hydroxides, and/or carbonates of Group 8, e.g., CaO, Ca(OH)$_2$, CaCO$_3$, NaOH, KOH, Fe$_2$O$_3$, and FeO)
106—Feed to extruder
108—Extruder
110—Feed to rotatable kiln reactor
112—Rotatable kiln reactor
114—Flue gas exiting rotatable kiln reactor
115—Pyrolysis char exit
116—Devolatilization train
118—Pyrolysis char
120—Feed to first condenser (also termed "thermal cracking feed" or "thermal cracking product") in some instances)
122—First condenser (also termed "direct contact condenser," in some instances)
124—Feed to second condenser (overhead from first condenser, also termed "first overhead" in some instances)
126—Second condenser
128—Second liquid
130—Feed to third condenser (overhead from second condenser, also termed "noncondensed second overhead" in some instances)
132—Third condenser
134a—Overhead from third condenser (also termed "noncondensed light product" in some instances)
134b—Condensate from third condenser (light product, also termed "condensed light product" in some instances)
136—Vapor reduction train (knockout pot, seal pot, demister)
138—Noncondensed material (e.g., syngas)
140—Syngas to flare
142—Syngas to combustor
144—First liquid (liquid from first condenser)
146—Recycle of first liquid from first condenser
148—Feed to separation train
150—Liquid-solid separation train
152—Control input to separation train
154—Information output from separation train
156—Solids (e.g., char) from separation train
158—Pyrolysis oil from separator train
160—Pyrolysis oil product As shown in FIG. 1, in system 100 feedstock 102 and optionally an additive 104 (e.g., an inorganic additive, such as oxides, hydroxides, and/or carbonates of Group 1; oxides, hydroxides, and/or carbonates of Group 2; and/or oxides, hydroxides, and/or carbonates of Group 8, e.g., CaO, Ca(OH)$_2$, CaCO$_3$, NaOH, KOH, Fe$_2$O$_3$, and FeO) are provided to extruder 108 via feedstock stream 106. Without being bound to any particular theory or embodiment, in material fed to extruder 108, the additive (or additives) can be present at up to about 5 wt % relative to the weight of feed 102.

Without being bound to any particular theory or embodiment, feedstock 102 can include, without limitation, thermoplastic and/or thermoset plastics, elastomers (e.g., scrap tires, rubber residue, rubber belting, EPDM rubber sheet, membrane or extrudate), wire casing (insulation), and the like. There is no requirement that a feedstock be free of impurities; as an example, a feedstock can include non-polymeric material. An exemplary feedstock material is PCR (post-consumer residue), which contains >70% polyolefins (consisting of multiple types of polyethylene and some polypropylene), some other non-polyolefin polymers, very low PET, very low PVC, and some contaminants (fillers, additives, external contaminants, such as dirt, fiber (paper, cardboard, etc.), and the like. Feedstock material can also be post-industrial waste, which tends to be a well characterized mixture of plastics. Such a feed stock can be recyclable, but this is not a requirement Extruder 108 can operate to combine the feedstock 102 and the additive (when present), and material can then be transferred via transfer path 110 (which can be a pipe or other conduit) to rotatable kiln reactor 112. (Exemplary rotatable kiln reactors are also described elsewhere herein, e.g., in FIG. 2, FIG. 3, and in Aspects 91-119.) It should be understood that a gas (e.g., nitrogen, other inert gas) can be introduced to the transfer path 110, though this is not a requirement.

An extruder can be configured to effect, e.g., one or more of compression, dewatering, shearing, melting, destabilizing and dehalogenating of the feedstock before the feedstock is communicated to rotatable kiln reactor 112.

Rotatable kiln reactor 112 can be, e.g., a rotatable kiln reactor that is rotatable in either direction. Rotatable kiln reactor 112 can be operable to have one temperature zone within the reactor, but rotatable kiln reactor 112 can also, in some embodiments, be operable to have a plurality of temperature zones within the reactor. As a non-limiting example, a rotatable kiln reactor can comprise heaters at different locations along the reactor's length, with the heaters being operated so as to give rise to zones within the reactor of different temperatures. For example, a rotatable kiln reactor might define three regions (or zones) along its length, with the first zone having a temperature of about 400 to about 425 deg. C., the second zone having a temperature of about 450 to 475 deg. C., and the third zone having a temperature of about 500 to about 525 deg. C.

A rotatable kiln reactor can also be constructed with an exterior manifold that receives a heated fluid, e.g., heated air or other gas. The manifold then distributes the gas to different compartments located exterior to and along the length of the reactor. The heated fluid can be distributed such that different compartments are heated to different temperatures, e.g., a first compartment heated to a temperature of from about 400 to about 450 deg. C., a second compartment heated to a temperature of from about 450 to about 500 deg. C., and a third compartment heated to a temperature of from about 500 to about 550 deg. C. A rotatable kiln reactor can comprise a control system configured to achieve and maintain preset temperatures at certain locations within the rotatable kiln reactor. In this way, a rotatable kiln reactor can be operable to achieve different temperatures in different locations (i.e., zones) along the length of the rotatable kiln reactor, which in turn allows the rotatable kiln reactor to be operated as desired so as to accommodate different feedstock materials.

In one embodiment, hot gas from a combustor (not shown) is introduced through a manifold into a muffle (which can be a ceramic lined outer tube that contains hot gas and allows the gas to swirl around the inner chamber of the rotatable kiln reactor) that surrounds a reactor tube within rotatable kiln reactor 112. There can be a pipe for the hot gas to enter an entrance manifold of the muffle, which then feeds the gas to one or more other pipes for the hot gas to continue on to the muffle. There can be a second manifold (exhaust manifold) above the first that removes the hot gases from the muffle. The second manifold can include pipes exiting the muffle that transition to a larger pipe that leads to an exhaust fan and an exhaust stack.

Zones can be defined by refractory material (e.g., in the form of rings) disposed between the muffle and the inner chamber of the rotatable kiln reactor and encircling the inner chamber. There can be one zone or a plurality (e.g., two, three, four, five, six) zones, and each zone can be fed (and exhausted) by one or more pipes from the entrance manifold (and one or more pipes from the exhaust manifold). The zones need not be equal in length, though they can be. In such an embodiment, rotatable kiln reactor temperature (amount of total energy to the rotatable kiln reactor) can be modulated by combustor temperature (which can in turn be a function of the flow rate of natural gas or other fuel to the combustor), and delivery rate of the heated fluid from the combustor to the rotatable kiln reactor. Additional air can be added to boost the velocity of the hot air going to the muffle and/or rotatable kiln reactor.

Individual zone temperatures can be controlled in a variety of ways. In one embodiment, the temperature zone closest to the exit of the rotatable kiln reactor can be the hottest of the zones and can have a temperature set by combustor exhaust temperature and hot gas flow rate. Once the temperature of that zone is set, dampers to the other zones can be adjusted to enable ambient air to control (lower) temperature of individual zones.

As a non-limiting example, a rotatable kiln reactor can define four temperature zones from its entrance to its exit. The temperature of the first zone (closest to the kiln entrance) can be from about 315 deg. C. to about 593 deg. C.; the temperature of the second zone can be from about 482 deg. C. to about 593 deg. C. the temperature of the third zone can be from about 482 deg. C. to about 593 deg. C., and the temperature of the fourth zone (closest to the kiln's exit) can be from about 537 deg. C. to about to about 704 deg. C.

The temperature of the zones in the rotatable kiln reactor can be configured to perform differing processes on the material fed to the rotatable kiln reactor. As a non-limiting example, a first zone can be configured so as to effect melting of the material fed to the rotatable kiln reactor; the first zone can also be configured to effect an initial cracking of the fed material. A second zone can be configured to effect initiation of cracking for olefinic materials present in the reactor. A third zone can be configured to effect devolatilization, e.g., in which volatiles are driven off. Such volatiles can be drawn out via a vent in fluid communication with the interior of the reactor; volatiles can be communicated to a condenser. A fourth zone can be configured to effect char devolatilization.

Without being bound to any particular theory or embodiment, a temperature that is too high can overcrack the polymeric (e.g., plastic) material being processed and can give off too much gas. A temperature that is too low can fail to crack all of the plastic and molten plastic will exit with the char. Again without being bound to any particular theory or embodiment, as plastic is fed at a higher rate (determined by the extruder) to the rotatable kiln reactor higher temperatures may be required to process the plastic and avoid having molten plastic exit the back of the rotatable kiln reactor. Conversely, when plastic is fed at a lower rate to the rotatable kiln reactor (during testing or ramp-up), temperatures can be lowered somewhat.

As shown in FIG. 1, rotatable kiln reactor 112 can be heated by heated fluid (e.g., hot air or other gas) supplied by a combustor (not shown). A combustor can also be supplied with syngas or other noncondensed products 142 from other regions of system 100. One or more heating elements can be disposed near, on, or even in the kiln so as to supply heat to the kiln.

Rotatable kiln reactor 112 can be oriented such that the rotatable kiln reactor is horizontal, but this is not a requirement. A rotatable kiln reactor can be inclined such that it is angled with a negative incline or slope, i.e. declining, with respect to the horizon such that an entrance end of the rotatable kiln reactor is at a higher elevation than the exit end of the rotatable kiln reactor, thereby allowing the force of gravity to assist in the transport of partially decomposed material through declining thermal rotatable kiln reactor; the internal components of thermal rotatable kiln reactor can also be configured to promote transport in concert with the force of gravity. The negative incline can be between about 1° and about 20° off of the horizontal, with a negative incline of about 1.0° to about 6° off of the horizontal being especially suitable. The rotatable kiln reactor 112 can also be oriented or pitched in the opposite or positive inclining direction, e.g., when the internal components of rotatable kiln reactor 112 are configured to physically advance the fed material, thereby overcoming the force of gravity, via rotation of the rotatable kiln reactor. The positive incline can be between about 1° and about 20° off of the horizontal, with the preferred positive incline being about 1.0° to about 6° off of the horizontal. A rotatable kiln reactor can be angled at, e.g., from about −20° (decline) to about +20° (incline) with respect to the horizontal.

A rotatable kiln reactor can be configured such that the material communicated to the rotatable kiln reactor undergoes one or more of mixing, molecular destabilization, and pyrolysis.

A rotatable kiln reactor can be operated such that the internal reactor temperature range is appropriate to the blend of raw material introduced into the rotatable kiln reactor, e.g., between about 232° C. (450° F.) and about 704° C. (1300° F.), and at in situ derived reactor pressure, generally at a slight vacuum (e.g., less than 5 inches of water) or at or around 1 atm. The residence of the raw material (feed) can be, e.g., from about 30 minutes to about 90 minutes. Without being bound to any particular theory or embodiment, the lack of oxygen, coupled with high temperature over the applied residence time results in various pyrolysis reactions taking place governed by high-order reaction kinetics, breaking down the polymeric material into volatile vapors and char material. The vapor stream is composed primarily of vapor, but can contain aerosol liquids and condensable molecules. This vapor stream is subject to further downstream treatment (described elsewhere herein), wherein condensable and non-condensable vapors are separated. The condensable vapors can form liquids including oil, light sweet crude oil, fuel additives, and base oil. A heavier fraction can form solid products, e.g., in the form of wax. The non-condensable vapors or gases can be recovered and can be optionally passed to a genset, to produce electric power. As an illustrative example, a feed can experience a residence time in the kiln of from about 30 to about 90 minutes, across all zones of the kiln. A feed can have a residence time of from about 10 to about 30 minutes in the first zone of a kiln (e.g., placing the feed into molten plastic form). The feed can then have a residence time of from about 10 to about 30 minutes in a second zone of the kiln (e.g., such that the second zone effects cracking of plastic in the feed). A feed can then have a residence time of about 10 minutes in a third zone of the kiln (e.g., achieving a vapor/liquid form), and then a residence time of about 5 minutes (e.g., to provide vapor and for drying solids) in a fourth zone of the kiln. The foregoing residence times and descriptions are illustrative only and not limiting of the present disclosure.

A rotatable kiln reactor can have an inner chamber of constant cross-section (e.g., a cylindrical or tubular chamber), but this constant cross-section is not a requirement. As one example, a rotatable kiln reactor can have an inner chamber that narrows, tapers, or otherwise defines a varying or non-constant cross-section along its length. For example, a rotatable kiln reactor can have an inner chamber that defines an inner diameter of about 2 meters along 70% of the length of the inner chamber, with the inner chamber then narrowing to an inner diameter of about 1 meter along the final 30% of its length. In some embodiments, a rotatable kiln reactor can include an auger or other module to transport char or other material within the rotatable kiln reactor.

As one example, in a rotatable kiln reactor that defines a cross-section that narrows from 2 meters to 1 meter, the rotatable kiln reactor can include an auger that acts to assist material from moving from the wall of the rotatable kiln reactor at the 2 meter diameter region to the wall of the rotatable kiln reactor at the 1 meter diameter region.

The ultimate yields of condensable hydrocarbons, as well as relative material balance of oil, gas, char and inorganic residue, are influenced by several factors. These factors include, but are not limited to, operating temperature, interplay of the geometry of the rotatable kiln reactor versus raw material throughput rate, residence time required for pyrolysis reactions to go to completion, desired magnitude of reaction completions, raw material composition, and recovery of product. The rotatable kiln reactor geometry can be a function of factors including but not limited to length of the chamber of the thermal rotatable kiln reactor, the rotatable kiln reactor diameter, the internal design of the rotatable kiln reactor, and the rate of mass loss via vapor evolution and emission.

Operation of the rotatable kiln reactor can result in significant loss of mass of the feed material as pyrolysis proceeds on the continuously advancing feed material and vapor is expelled from the reactor. The rotatable kiln reactor can operate as a boiler in which the pyrolyzing feed material exhibits a boiling and dynamic transitional interface of vapor above incompletely pyrolyzed feed material. This transitional surface continually evolves as it boils under conditions of the dynamic equilibrium until the feed material is effectively pyrolyzed, leaving the solid char material and any incompletely pyrolyzed feed material. An accompanying change in viscosity of the feed material can be experienced in the reactor as pyrolysis proceeds to completion.

In cases where accelerated evacuation of product vapor is desired, and depending upon the product mix desired, a non-condensable carrier gas can be introduced into the rotatable kiln reactor. Optional addition of carrier gas results in a proportional increase in vapor flow exiting the rotatable kiln reactor. Such non-condensable carrier gas can be comprised of, e.g., nitrogen and/or a recycled non-condensable gas fraction resulting from operation of the present invention and/or methane from natural gas or any blend of these non-condensable gases. Use of a recycled gas and/or methane as an alternative to nitrogen for carrier gas has a benefit of increased BTU content of produced process gas in the absence of dilution by nitrogen, as well as decreased operating expenses by eliminating the need to purchase or generate nitrogen. This aspect of the present disclosure can, depending upon raw material composition and range of operating conditions, also result in the unanticipated benefit of increase in oil yield, unanticipated albeit modest benefit of slight increase in hydrogen concentration of the reactor atmosphere in the pyrolysis environment, and an unanticipated increase in the hydrogen concentration of resulting process gas.

Char developed in rotatable kiln reactor 112 can exit rotatable kiln reactor 112 via line 115. The char can then be processed by airlock valve assembly 116 (also termed "drying train" or "devolatilizing train" or "double dump valve" in some instances). Without being bound by any particular theory or embodiment, airlock valve assembly 116 can comprise a first valve, a holding chamber, and a second valve. (It should be understood that "devolatilizing" can include removing volatile substances.)

Char can initially be disposed atop the first valve, where the char can be devolatilized via application of heat within the rotatable kiln reactor. The first valve can be actuated so that the char, e.g., by gravity, enters the holding chamber. (The first valve can then be closed.) While in the holding chamber, a heated fluid (e.g., a gas, such as nitrogen; such gas can be heated) can be introduced so as to further devolatilize the char. Following exposure to the heated fluid, the second valve can be opened, and the devolatilized char then exits the holding chamber and is communicated via char exit line 118. Some char can become entrained in the vapor within rotatable kiln reactor 112, which char then exits the rotatable kiln reactor in feed 120. Without being bound to any particular theory or embodiment, a gas (e.g., nitrogen, or other inert gas) can be introduced at feed 120 to the vapor and gas being communicated from rotatable kiln reactor 120.

Char exiting the kiln reactor can include three components:

1. Calcium oxide (or other additives) and calcium compounds, such as $CaCl_2$, $Ca(OH)_2$, CaS, and the like.
2. Metals and inorganics that can be present as fillers and/or external contamination to the feedstock.
3. In-situ carbon, created during pyrolysis.

In an example embodiment, the polymer mass, carrying 1 and 2 (above) enters the kiln as a molten mass and is transported through the kiln, increasing in temperature, e.g., from about 480 deg. C. (entrance) to about 593 deg. C. (exit). A kiln can be at a slight (1 degree) angle of declination, such that gravity helps to transport the molten plastics. As the plastic decomposes to form (condensable) vapor and (non-condensable) gas, carbon (3, above) is formed. The carbon combines with 1 and 2 (above) to form the char. Completion of plastic decomposition can occur about ½ way to ⅔ of the way along the length of the kiln.

The molten mass is carried forward by the sweep and drag chains within the reactor. The walls of the reactor are kept clean by the sweep and drag chains. The thermal contact between the walls of the reactor and the molten plastics is improved by the use of the drag/sweep chains, which allow for contact surfaces to be continually refreshed.

As the chains offer forward motive force, dams offer barriers or restrictions to forward movement. The balance between chains and dams can provide optimized forward movement (and hence optimized residence time) of molten plastic in the heated kiln). In the current system configurations, dam height is minimal.

As the plastic mixture cracks and vapor/gas is formed, the char (collectively) can be saturated by the gas/vapor. To assist the char drying process, lifters are located in the back ⅓ of the kiln. The lifters can be upside-down angle irons welded to the interior kiln wall. These are placed in an optimal pattern to provide maximum movement of the char, short of creating significant lofting of the char into the volume of the kiln. The char suitably exits the kiln dry and remains dry. The vapor suitably exits the kiln wet, with minimal char entrainment.

As the char is drying in the comparatively hot exit zone of the kiln, it can be taken up by the triple-start auger, which can be a short "screw type" of transport mechanism to capture/transport the char out of the kiln. As the char exits the triple-start auger, it falls onto the top flap valve of the double-dump flap valve assembly, where it is held momentarily. After a time (e.g., approximately 30 seconds), the valve is opened for several seconds, during which time the char flows from the top flap valve to the bottom flap valve. As the top flap valve again closes, the char is now between the two valves. Pressurized, heated nitrogen can be introduced in between the flap valves, and forced back up into the kiln. This helps to keep the char dry. Nitrogen moving backwards helps to prevent hydrocarbons from moving forwards. After a period (e.g., approximately 30 more seconds), the lower flap valve is opened for several seconds, then closed again. The aliquot of char that was between the two flap valves is not entering the char cooling screw.

The double-dump flap valve assembly (shown and described herein) can be heated, e.g., to approximately 482 deg. C., insulated on the outside, and purged with hot nitrogen (e.g., at about 482 deg. C.) on the interior. The purpose of the double-flap valve assembly is to move char forward to the cooling screw assembly, which can reduce char temperature (e.g., from approximately 482 deg. C. to approximately 49 deg. C.), without allowing for air to back-diffuse into the kiln and without allowing condensable hydrocarbon vapors from the kiln to escape into the char.

Thus, the double-flap valve assembly operates with the following:

1. Upper and lower flap valve sequencing, elapsed time between openings, and open time.
2. Sequencing of nitrogen between the valves for purging and drying.

As shown, vapor and gas from rotatable kiln reactor 112 is communicated to the first condenser 122 (also termed "direct contact condenser," in some instances) as the feed 120 to the first condenser. First condenser 122 can be a spray down condenser, in some embodiments. As shown, first condenser can be operable such that at least a portion of first condenser feed 120 condenses as first liquid 144, which first liquid can include char. (Char is, as described elsewhere herein, produced during operation of rotatable kiln reactor 112.) First liquid 144 can also include pyrolysis oil, and can also include other comparatively heavy species.

Pyrolysis oil is the product of pyrolyzing organic polymeric materials (e.g., plastics), and is similar—though not identical—to natural crude oil. Pyrolysis oil contains paraffins, olefins, iso-paraffins, aromatics, naphthenes. Pyrolysis oil can contain a minimum of 15 wt % olefins, whereas natural crude oil typically contains little to no olefins. Pyrolysis oil can boil at from about 35 deg. C. to about 649 deg. C.

Uncondensed material from first condenser 122 can be communicated as feed 124 to second condenser 126. Second condenser 126 can be operated to give rise to uncondensed material that communicated as feed 130 to third condenser 132. Feed 124 to second condenser 126 can be condensed by second condenser 126 to a liquid, which liquid (second liquid 128, also termed "second condensate" in some instances) can comprise, e.g., an amount of pyrolysis oil. As shown, second liquid (or second condensate) 128 can form at least a portion of pyrolysis oil product stream 160, which product stream can be collected.

Feed 130 can be communicated to third condenser 132, as shown. Third condenser 132 can be operated to condense at least a portion of feed 130 to give rise to condensate 134*b* from third condenser 132. Condensate 134*b* (also termed "third liquid," or "light product," or "light pyrolysis oil" or "third condensate" in some instances) can be collected.

Light pyrolysis oil 134*b* can comprise at least some pyrolysis oil. Light pyrolysis oil 134*b* can also comprise relatively light materials, e.g., naphtha. (Naphtha can boil at from, e.g., about 35 deg. C. to about 232 deg. C.)

Overhead 134*a* from third condenser 132 can comprise uncondensed species (e.g., syngas). Overhead 134*a* communicated to a vapor reduction train 136, which vapor reduction train can comprise, e.g., one or more of a knockout pot, a seal pot, or a demister. It should be understood that vapor reduction train 136 is optional and need not necessarily be present. Noncondensed material 138 (which can include syngas or other gases) can be sent (e.g., via stream 140) to a flare. Noncondensed material can also be sent via stream 142 to a combustor or other unit configured to provide hot gas and/or vapor used to heat rotatable kiln reactor 112.

Returning to first condenser 122, operation of the first condenser to at least partially condense feed 120 from rotatable kiln reactor 112 can give rise to first liquid 144 (sometimes termed "first condensate"), which first liquid can comprise an amount of particulate (e.g., char) disposed therein. First liquid 144 can be communicated toward filter train 150; as shown a portion of first liquid 144 can be communicated via recycle stream 146 back to first condenser 122. Without being bound to any particular theory or embodiment, at least some of first liquid that is returned to first condenser 122 can be utilized in the operation of condenser 122. As but one example, when first condenser 122 is a spray down condenser, first liquid 146 that is returned to first condenser 122 can be used as the spray, e.g., such that the returned first liquid is contacted to (e.g., via spraying) feed 120 to first condenser 122.

First liquid can then be communicated (as feed 148) to separation train 150. Separation train 150 can include, e.g., a filter, a centrifuge, a decanter centrifuge, and/or a multi-phasic decanter centrifuge. A separation train can include a continuous filter, continuous filtration, and/or a continuous filtration device. As but one example, a filter in separation train 150 can be configured such that the filter is wiped down or "squeegeed" on an ongoing basis such that the filter is operating in a continuous manner and need not be taken offline. Separation train 150 can also comprise a backflush filter that removes and collects accreted material on an ongoing basis.

As shown, separation train 150 can include an input module 152, which input module can be used to provide operational inputs to separation train 150. Separation train 150 can also include information output 154, which can provide operational data (e.g., internal conditions) related to the separation train. It should be understood that other elements of the disclosed systems (e.g., extruder 108, rotatable kiln reactor 112, first condenser 122, second condenser 126, third condenser 132) can also include control input and/or data output modules.

Solids 156 (e.g., pyrolysis char) can be collected from separation train 150. Without being bound to any particular theory or embodiment, the water mass fraction of solids (e.g., char) from separation train 150 can range from about 0 wt % to about 40 wt %. Again without being bound to any particular theory or embodiment, char solids from a separator can be, e.g., about 0 wt % to about 40 wt % water, 0 wt % to about 40 wt % pyrolysis oil, about 50 wt % to about 100 wt % carbon, and about 0 wt % to about 25 wt % additives or related compounds. Solids can be collected in bulk bags or other containers.

As shown, pyrolysis oil 158 can be collected from separation train 150. Pyrolysis 158 from collected from separation train 150 can form at least a portion of pyrolysis oil product stream 160, which product stream can be collected.

Figure 2:
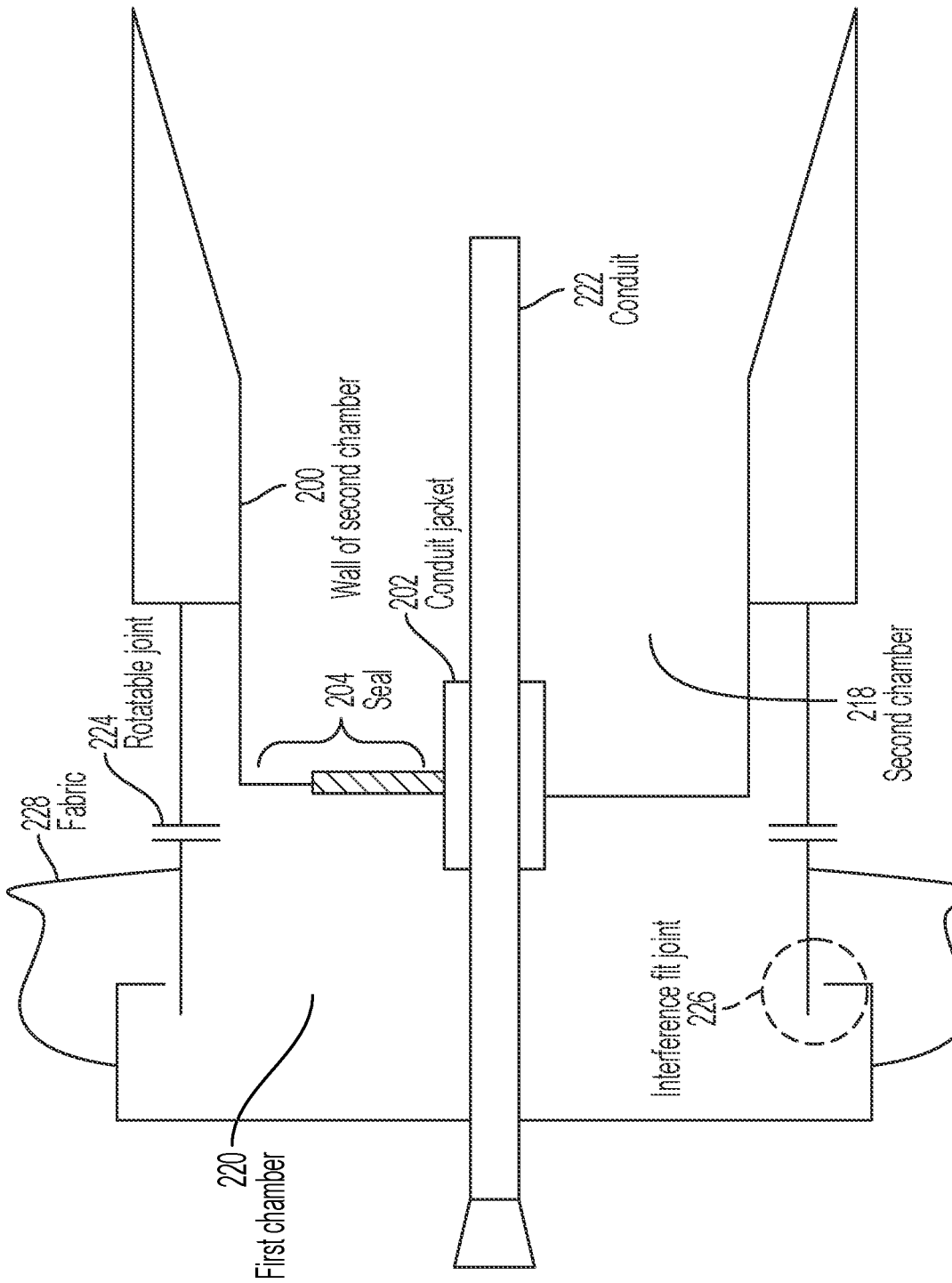
FIG. 2 provides a cutaway view of a process module according to the present disclosure.

FIG. 2 provides a cutaway view of a portion of process module (also termed an "operations unit" in some places) using a seal according to the present disclosure. Such a module can be, e.g., a pyrolysis reactor or system, such as a reactor that pyrolyzes hydrocarbonaceous materials. Example such reactors and systems can be found in, e.g., United States published patent application nos. US2016/0024390 and US2016/0017232.

As shown in FIG. 2, conduit 222 can be used to convey a material (e.g., scrap plastics, rubber and the like; material can be solid, liquid, or even molten) to a second chamber 218; conduit 222 can extend through first chamber 220. As shown, first chamber 220 can comprise a rotatable joint 224, which rotatable joint can allow for relative rotation between the first chamber and the second chamber. Rotatable joint 224 can be a face-to-face seal, e.g., a face-to-face seal that comprises one or more graphite seals, carbon rope seals, metal leaf seals, or the like. As an example, a rotatable joint can comprise two O-rings made of carbon rope that is braided with a 1 inch square cross section. Each O-ring can sit in a groove, which O-ring is then pressed against a face plate with a spring.

First chamber 220 can also define an interference fit joint 226, which interference fit joint 226 can be enclosed by fabric 228, which fabric can be arranged as a bellows or other enclosure about first chamber 220. It should be understood that fabric 228 can be a coated fabric, e.g., a flexible composite structure. Fabric 228 can be a multi-layered material, e.g., a sandwich-type material, a material with alternating layers, and the like. Fabric 228 can be, e.g., a rubber-impregnated mesh or screen material.

Conduit 222 can extend through conduit jacket 202, which can be configured as a sleeve or collar. Seal 204 can extend (e.g., radially outward) from conduit jacket 202 toward wall 200 of second chamber 218. In some embodiments, an industrial process (e.g., pyrolysis, combustion, dehalogenation, cracking, and the like) is performed in second chamber 218. By way of seal 204, product and byproduct of a process performed in second chamber 218 is retained in second chamber 218 and does not enter (or is at least partially restrained from entering) first chamber 220. In this way, seal 204 and first chamber 220 cooperate so as to retain product and byproduct from a process performed in second chamber 218 from exiting the process module and entering the environment exterior to the process module. Without being bound to any particular theory, a process module can be arranged such that second chamber 218 rotates about an axis, e.g., such that second chamber 218 rotates about conduit 222 and/or conduit jacket 202. Portions of seal 204 can also be rotatable; in this way, second chamber 218 can rotate while product and byproduct from a process performed in second chamber 218 is retained.

Although not shown in FIG. 2, a unit can also include one or more lines (e.g., parallel to conduit 202) that deliver a fluid (e.g., nitrogen gas) into the second chamber 202. Such lines can be enclosed within conduit 202; they can also be parallel to conduit 202 and be at least partially enclosed within conduit jacket 202.

Figure 3:
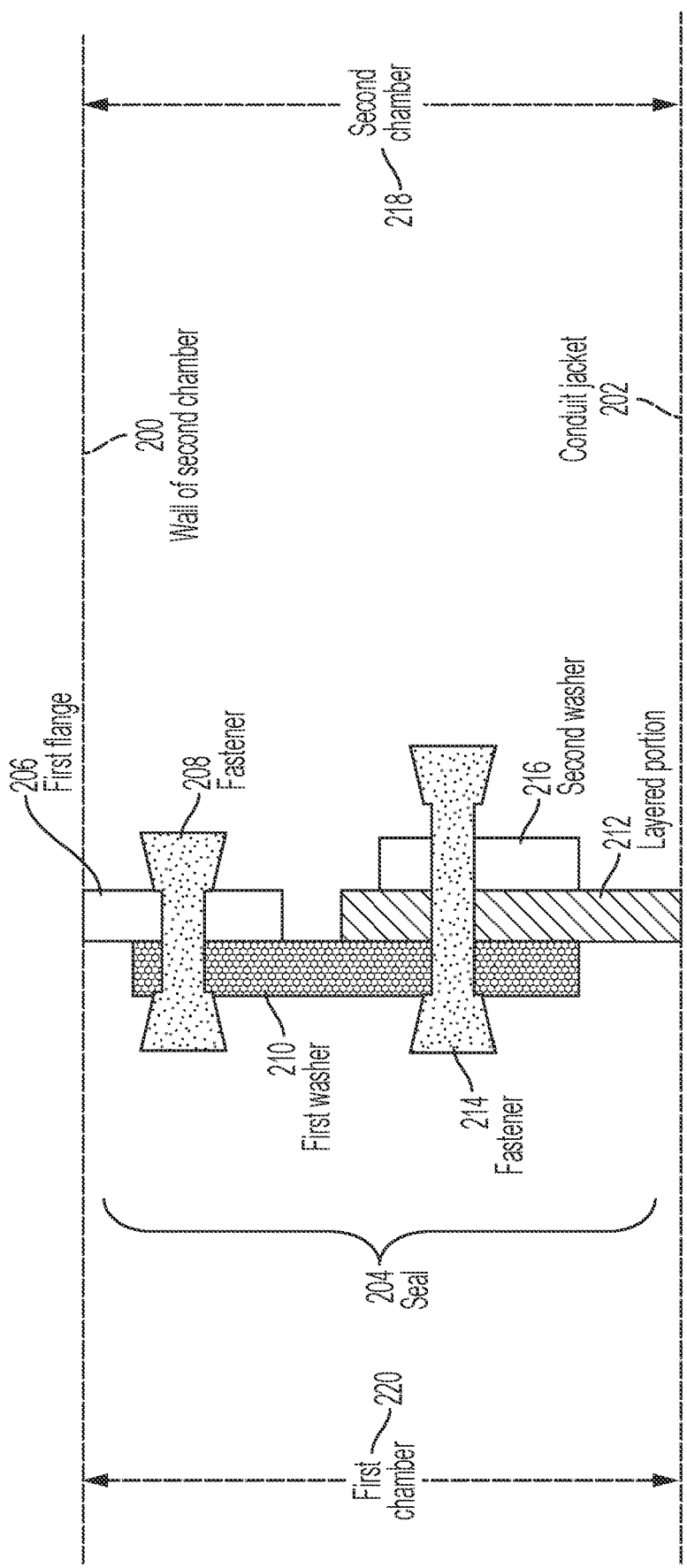
FIG. 3 provides a cutaway view of a seal according to the present disclosure.

FIG. 3 provides a closer, cutaway view of seal 204. As shown, seal 204 can separate first chamber 220 from second chamber 218. Also as shown, seal 204 can extend radially from conduit jacket 202 towards wall 200 of the second chamber. The seal can comprise a first flange 206. First flange 206 can be attached (e.g., via welding or other fastening) to wall 200 of second chamber 200. First flange 206 can comprise a metal, e.g., stainless steel or carbon steel and the like. Fastener 208 can secure first flange 206 to first washer 210. As shown, one or both ends of fastener 208 protrude beyond first flange 206 and first washer 210. This is exemplary only, however, as the ends of fastener 208 can be flush with one or both of first flange 206 and first washer 210. An end of fastener 208 can also be recessed from the surface of first washer 210 and/or first flange 206.

As shown, fastener 214 can secure first washer 210 to layered portion 212 and second washer 216. As shown, one or both ends of fastener 214 protrude beyond first washer 210 and second washer 216. This is exemplary only, however, as the ends of fastener 214 can be flush with one or both of first washer 210 and second washer 216. An end of fastener 214 can also be recessed from the surface of first washer 210 and/or second washer 216.

Layered portion 212 can comprise a plurality of material layers, which layers can be the same as one another, but can also differ from one another in terms of material, characteristics (e.g., pore size, weave, and the like). As shown, layered portion 212 can contact conduit jacket 202, e.g., via interference fit.

Although not shown in FIG. 2, seal 204 can include a brush. Such a brush can take the place of layered portion 212. This is not a requirement, however, as a brush can also be used in addition to layered portion 212. A brush can suitably include metallic bristles or other bristles formed of a refractory material.

In some embodiments, the entrance end of the kiln (i.e., the portion of the kiln prior to the exit end of the lance or conduit 222) can be kept at a lower temperature than the melting and pyrolysis sections of the kiln. As one example, the entrance end can be at 288 deg. C., while the internal kiln pyrolysis zone temperatures can be from 371 deg. C. to 649 deg. C. Despite the different temperatures throughout the kiln, the different portions of the kiln are open, and therefore are in thermal and fluid communication with each other, meaning that products (e.g., vapors of liquid hydrocarbon, waxy hydrocarbon) or byproducts (e.g., char particulate) are also in communication with the entrance end of the kiln. A bellows can be attached to the faceplate, which bellows does not rotate.

The entrance end of the kiln can include an end-plate (at the diameter of the kiln, which does not rotate), carbon seals, a fabric composite bellows (with an external temperature of 150 deg. C.), access ports, and the pass through lance (for feeding molten plastic). Although a kiln can be operated at a slightly negative pressure from atmospheric, material (such as vapor and particulate) that is being generated in the melting/pyrolysis zones and is in the internal volume of the kiln can migrate to the entrance end of the kiln and coat the lower temperature surfaces. The relatively cool portions of the entrance to the kiln, including access ports, seals, and bellows, can be subject to coating. As described, a bellows can comprise a multi-layer assembly, e.g., comprising a fluoropolymer film, a reinforced rubber, and the like.

The disclosed lance seals provide a barrier that allows for gases (e.g., nitrogen and hydrocarbon) to flow through without pressure drop, but does not permit the passage of liquid or waxy hydrocarbons, (which can condense on the surface internal to the kiln), or particulate (which can be trapped by the coated weave structure of the lance seal). Thus, a lance seal can allow non-condensables (natural gas, nitrogen) to flow through, while also catching particulate and condensables. This in turn provides the following benefits:

1. Simpler cleanout in between plant runs (if needed). By using the disclosed lance seals, nearly zero material accumulates in the bellows, as compared to the significant material that accumulates in the bellows with existing methods.
2. Reduced stress to rotatable seals.
3. Reduced damage to the fabric composite bellows.
4. Easier access to inspection ports after completion.

Aspects

The following Aspects are illustrative only and do not limit the scope of the present disclosure or the appended claims.

Aspect 1. A system for conversion of organic polymeric material to hydrocarbonaceous materials, comprising: a thermal cracking train, the thermal cracking train configured to effect molecular cracking of a polymeric material fed to the thermal cracking train; a condensing train, the condensing train configured to receive a thermal cracking product from the thermal cracking train and condense at least a portion of the thermal cracking product to give rise to a pyrolysis oil product from the thermal cracking product; and a separating train, the separating train configured to receive from the condensing train a first liquid comprising a solid material and the pyrolysis oil product, the separating train being configured to separate at least some of the pyrolysis oil product from the first liquid.

Aspect 2. The system of Aspect 1, wherein the thermal cracking train is configured to expose the polymeric material to a plurality of temperature zones.

Aspect 3. The system of any one of Aspects 1-2, further comprising a supply of at least one inorganic additive for communication to the thermal cracking train.

As described elsewhere herein, oxides, hydroxides, and/or carbonates of Group 1; oxides, hydroxides, and/or carbonates of Group 2; and/or oxides, hydroxides, and/or carbonates of Group 8, e.g., CaO, $Ca(OH)_2$, $CaCO_3$, NaOH, KOH, $Fe_2O_3$, and FeO can be added at a weight percentage that is a few percent of the weight of the polymeric material, e.g., at from about 1 to about 5 wt % of the polymeric material.

Aspect 4. The system of any one of Aspects 1-3, wherein the thermal cracking train is configured to devolatilize a char derived from cracking of the polymeric material. As described elsewhere herein, devolatilization can include removal of water, in some embodiments.

Aspect 5. The system of any one of Aspects 1-4, wherein the thermal cracking train comprises a reactor (e.g., a rotatable kiln reactor) defining a reaction chamber having a length and being operable to have a plurality of temperature zones along the length of the reaction chamber. Such a reactor can be, e.g., a rotatable kiln reactor, among other reactor types.

Aspect 6. The system of any one of Aspects 1-5, wherein the condensing train comprises a first condenser in fluid communication with the thermal cracking train, the first condenser optionally configured as a direct contact condenser (e.g., a spray down condenser), and the first condenser being configured to receive the thermal cracking feed from the thermal cracking train.

Aspect 7. The system of Aspect 6, wherein the first condenser effects contact between (1) recycled first liquid received by the first condenser from the separating train and (2) thermal cracking feed received by the first condenser from the thermal cracking train. Such contact can be by, e.g., spraying the recycled first liquid down into the thermal cracking feed received by the first condenser.

Aspect 8. The system of any one of Aspects 6-7, wherein the condensing train comprises a second condenser, the second condenser configured to receive a first overhead from the first condenser, and the second condenser being configured to produce, from the first overhead, a condensed pyrolysis oil product and a noncondensed second overhead.

Aspect 9. The system of Aspect 8, wherein the condensing train comprises a third condenser configured to receive the noncondensed second overhead from the second condenser, and the third condenser being configured to produce, from the noncondensed second overhead, a noncondensed product and a condensed light product.

Aspect 10. The system of Aspect 9, wherein the thermal cracking train is configured to combust the noncondensed product so as to generate heat used in the thermal cracking train. As but one example, the noncondensed product can comprise a syngas, which syngas is communicated to a combustor that supplies heat to a rotatable kiln reactor of the thermal cracking train.

Aspect 11. The system of any one of Aspects 9-10, further comprising a flare train configured to flare the noncondensed product.

Aspect 12. The system of any one of Aspects 1-11, wherein the system is configured to communicate at least some of the first liquid that exits the condensing train back to the condensing train. As an example, as shown in FIG. 1, at least some of first liquid 144 that exits first condenser 122 can be recycled to first condenser as stream 146.

Aspect 13. A method, comprising operating a system according to any one of Aspects 1-12 so as to convert a polymeric material to a char, a gas, and a pyrolysis oil product, the method optionally being performed continuously.

Aspect 14. The method of Aspect 13, wherein the pyrolysis oil product has a boiling range of from about 35 deg. C. to about 704 deg. C. A pyrolysis oil product can have a boiling range of from about 35 deg. C. to about 704 deg. C., or from about 38 deg. C. to about deg F. to about 649 deg. C., or from about 66 deg. C. to about 593 deg. C., or from about 82 deg. C. to about 538 deg. C., or from about 110 deg. C. to about 510 deg. C., or from about 149 deg. C. to about 427 deg. C., or from about 177 deg. C. to about 343 deg. C., as some examples.

Aspect 15. The method of any one of Aspects 13-14, wherein the pyrolysis oil product comprises from about 10 wt % to about 70 wt % olefin, e.g., from about 15 wt % to about 55 wt % olefin, from about 16 wt % to about 54 wt % olefin, from about 17 wt % to about 53 wt % olefin, from about 20 wt % to about 50 wt % olefin, from about 22 wt % to about 45 wt % olefin, from about 25 wt % to about 40 wt % olefin, or from about 30 wt % to about 35 wt % olefin.

Aspect 16. The method of Aspect 15, wherein the pyrolysis oil product comprises from about 20 wt % to about 45 wt % olefin.

Aspect 17. A method, comprising: effecting thermal cracking of a polymeric material so as to give rise to a thermal cracking product and a char; optionally devolatilizing and collecting at least some of the char; condensing at least a portion of the thermal cracking product so as to give rise to (1) a first liquid comprising at least some of the char and a pyrolysis oil product, and (2) a first overhead comprising at least some of the pyrolysis oil product; separating at least some of the pyrolysis oil product from the first liquid; condensing a portion of the first overhead so as to give rise to (1) a second liquid comprising the pyrolysis oil product and (2) a second overhead; and collecting the second liquid.

Aspect 18. The method of Aspect 17, further comprising contacting at least some of the first liquid to the thermal cracking product.

Aspect 19. The method of any one of Aspects 17-18, wherein separating at least some of the pyrolysis oil product from the first liquid is performed via centrifugal separation. Such centrifugal separation can be effected by, e.g., multiphasic centrifugal separation.

Aspect 20. The method of any one of Aspects 17-19, further comprising condensing at least a portion of the second overhead product so as to give rise to a syngas and to a light product output.

Aspect 21. The method of any one of Aspects 17-20, wherein the method is performed in a continuous manner.

Aspect 22. A thermal cracking treatment train, comprising: a rotatable kiln reactor; the rotatable kiln reactor being configured to receive a polymeric feed material, the rotatable kiln reactor defining at least one interior wall that bounds an interior volume of the rotatable kiln reactor, the interior volume defining an entrance and an exit along a direction of feed material travel, the rotatable kiln reactor comprising a section that comprises one or more sweeping features configured to sweep, with rotation of the rotatable kiln reactor, a portion of the at least one interior wall, the rotatable kiln comprising a section that comprises one or more lifter features extending from the at least one interior wall and configured to, with rotation of the rotatable kiln reactor, encourage material disposed on the one or more features to fall into the interior volume of the interior of the rotatable kiln reactor; a combustor configured to provide a heated gas to the rotatable kiln reactor, the combustor optionally configured to receive and combust a non-condensed hydrocarbonaceous vapor; and a devolatilization train, the devolatilization train optionally comprising a first valve, a holding chamber, and a second valve, the first valve configured to interrupt fluid communication between the interior volume of the rotatable kiln reactor and the holding chamber, and, the second valve being configured to interrupt fluid communication between the holding chamber and an environment exterior to the holding chamber.

Aspect 23. The thermal cracking train of Aspect 22, further comprising an auger configured to communicate a material into, along, or out of the interior volume of the rotatable kiln reactor.

Aspect 24. The thermal cracking train of Aspect 23, wherein the auger is configured to communicate a material out of the exit of the interior volume of the rotatable kiln reactor.

Aspect 25. The thermal cracking train of any one of Aspects 22-24, further comprising a gas delivery train configured to communicate a gas to the holding chamber. A gas delivery train can comprise a conduit, a pump, and the like.

Aspect 26. The thermal cracking train of any one of Aspects 22-25, further comprising a gas delivery configured to communicate a gas to the interior volume of the rotatable kiln reactor.

Aspect 27. The thermal cracking train of any one of Aspects 25-26, wherein the gas is nitrogen. Without being bound to any particular theory, a flow of nitrogen (or other gas, including inert gases, non-condensable gases, and the like) can be used to reduce accretion of material on an interior wall of the rotatable kiln reactor.

Aspect 28. The thermal cracking train of any one of Aspects 22-27, wherein the rotatable kiln reactor defines one or more chambers disposed about the interior volume of the rotatable kiln reactor, the one or more chambers being configured to receive the heated fluid from the combustor.

Aspect 29. The thermal cracking train of Aspect 28, wherein the rotatable kiln reactor comprises one or more baffles configured to modulate the amount of heated fluid distributed to the one or more chambers.

Aspect 30. The thermal cracking train of any one of Aspects 28-29, wherein the amount of heated fluid received by the one or more chambers effects zones of different temperature along the direction of material travel.

Aspect 31. The thermal cracking train of any one of Aspects 22-30, wherein the rotatable kiln reactor is configured to define a plurality of temperature zones of different temperature along the direction of material travel. As an example, the rotatable kiln reactor can define a first temperature zone that operates at a temperature that is, e.g., 20 deg. C. less than the temperature of a second temperature zone.

Aspect 32. The thermal cracking train of Aspect 31, wherein the rotatable kiln reactor is configured to define at least a first temperature zone and a second temperature zone, the temperature of the first temperature zone differing from the temperature of the second temperature zone. It should be understood that a rotatable kiln reactor can be configured such that material that traverses the interior of the reactor (from entrance to exit) traverses temperature zones of increasing or equal temperature. This is not a requirement, however, as a rotatable kiln reactor can define a first zone operating at a temperature T, a second zone that operates at a temperature that is 10 or 15% greater than T, a third zone that operates at a temperature that is 10 to 15% less than T, a fourth zone that operates at temperature T, and a fifth zone that operates at a temperature that is 15 to 20% greater than T. In this way, material that traverses the interior of the reactor can experience, as the material moves from zone to zone, increasing temperature, decreasing temperature, or equal temperatures. Zones can be of different length such that material that traverses the interior of the reactor spends different amounts of time in different zones. (This is not a requirement, however, as different zones can be sized such that material that traverses the interior of the reactor has equal residence times in at least two different zones.) Without being bound to any particular theory or embodiment, the zones of a kiln can define a temperature difference (along the length of the kiln) of from about 65 deg. C. to about 120 deg. C. As an example, a zone at one end of the kiln may operate at a temperature of 566 deg. C., and a zone at the other end of the kiln may operate at a temperature of 482 deg. C., thereby defining an end-to-end difference of 84 deg. C. As another example, a zone at one end of a kiln may operate at a temperature of 566 deg. C. and a zone at the other end of the kiln may operate at a temperature of 454 deg. C., thereby defining an end-to-end difference of 122 deg. C. Adjacent zones in the kiln can differ from one another by, e.g., from about 5 deg. C. to about 50 deg. C., e.g., by 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or even 50 deg C. The temperature of a given zone can vary from its adjacent zones by the same number of degrees, but this is not a requirement. For example, a second zone of a kiln can differ in temperature by 10 deg. C. from the first zone of the kiln and also by 10 degrees C. from the third zone of the kiln. Alternatively, a second zone of a kiln can differ in temperature by 10 deg. C. from the first zone of the kiln and by 15 degrees C. from the third zone of the kiln. The temperature of a zone can be measured at the approximate center of the zone within the volume of the kiln (e.g., at the radial center of the zone) at the midpoint of the zone's axial length as measured along the length of the kiln.

Aspect 33. The thermal cracking train of any one of Aspects 22-32, wherein the rotatable kiln reactor comprises one or more portions of refractory material defining a plurality of temperature zones of different temperature along the direction of material travel. A reactor can include therein one or more ramps, dams, weirs, or other features.

Aspect 34. The thermal cracking train of any one of Aspects 22-33, wherein the one or more sweeping features comprises chains.

Aspect 35. The thermal cracking train of any one of Aspects 22-34, wherein the one or more lifter features comprise flanges, ridges, or any combination thereof. A flange can be attached to the interior wall of the rotatable kiln reactor, e.g., by bolts, screws, and the like. A ridge can be formed in the material of the interior wall of the rotatable kiln reactor. Without being bound to any particular theory or embodiment, a lifter and/or ridge can help to "loft" material on or near the wall of the rotatable kiln reactor (including material resting on the lifter or ridge) away from the wall of the rotatable kiln reactor, which lofting can improve heat transfer within the rotatable kiln reactor to the lofted material.

Aspect 36. The thermal cracking train of Aspect 35, wherein the one or more lifter features are generally oriented parallel to the direction of feed material travel. Lifter features can also be oriented at a angle to the direction of feed material travel so as to encourage lifted material in the direction of feed material travel. This is not a requirement, however, as lifter features can be oriented at an angle such that the features hamper movement of the material in the general direction of feed material travel.

Aspect 37. The thermal cracking train of any one of Aspects 22-36, comprising a supply of an inorganic additive for communication to the extruder.

Aspect 38. A method, comprising: operating a thermal cracking train according to any one of Aspects 22-37 so as to give rise to a thermal cracking product and a char, optionally devolatilizing and collecting at least some of the char, and optionally communicating the cracking product to one or more condensers.

Aspect 39. A method, comprising: effecting communication of a polymeric feed material within a rotatable kiln reactor having at least one interior wall, the polymeric feed material being exposed to two or more zones of different temperature within the rotatable kiln reactor, at least one of the two different temperature zones giving effecting thermal cracking of the polymeric feed material to (1) a thermal cracking product that comprises a pyrolysis oil product and (2) a char; at least partially devolatilizing the char to give rise to a first devolatilized char; collecting at least some of the first devolatilized char in a holding chamber; optionally interrupting fluid communication between the holding chamber and the rotatable kiln reactor; further devolatilizing the at least some of the first devolatilized char in the holding chamber to give rise to a second devolatilized char; collecting the second devolatilized char.

Aspect 40. The method of Aspect 39, further comprising effecting delivering a gas to the holding chamber so as to reduce entry of vapor from the rotatable kiln reactor into the holding chamber. As described elsewhere herein, such gas can be nitrogen, or other inert gas.

Aspect 41. The method of any one of Aspects 39-40, further comprising delivering a gas so as to remove material accretion on the at least one interior wall.

Aspect 42. The method of any one of Aspects 39-41, the polymeric feed material being exposed to from two to about six zones of different temperature within the rotatable kiln reactor.

Aspect 43. The method of Aspect 42, the polymeric feed material being exposed to four zones of different temperature within the rotatable kiln reactor.

Aspect 44. The method of any one of Aspects 39-43, wherein the method is performed in a continuous manner.

Aspect 45. A condensation train, comprising: a first condenser configured to condense, from a feed vapor provided to the first condenser, a first liquid that comprises a pyrolysis oil product, the first condenser optionally configured as a spray down condenser; a second condenser in fluid communication with the first condenser, the second condenser configured to receive a first overhead from the first condenser, the second condenser being configured to condense, from the first overhead, a second liquid that comprises the pyrolysis oil product; and optionally a third condenser in fluid communication with the second condenser, the third condenser configured to receive a second overhead from the second condenser, the third condenser configured to condense, from the second overhead, a third liquid comprising pyrolysis oil product.

Aspect 46. The condensation train of Aspect 45, wherein the first condenser is configured as a spray down condenser.

Aspect 47. The condensation train of any one of Aspects 45-46, further comprising a flare train configured to flare noncondensed product from the third condenser.

Aspect 48. The condensation train of any one of Aspects 45-47, further comprising a fluidic loop configured to communicate first liquid to the first condenser. Such communication can be as a recycle stream.

Aspect 49. The condensation train of Aspect 48, wherein the fluidic loop comprises an adjustable flow diverter configured to divert at least some of the first fluid to the first condenser.

Aspect 50. The condensation train of any one of Aspects 45-49, wherein the first condenser is configured to contact the feed vapor with pyrolysis oil product communicated to the first condenser.

Aspect 51. The condensation train of any one of Aspects 45-50, further comprising a gas delivery train configured to communicate a gas to the first condenser, the gas delivery train optionally comprising a transfer pipe.

Aspect 52. The condensation train of Aspect 51, wherein the gas is nitrogen.

Aspect 53. The condensation train of any one of Aspects 45-52, wherein the first condenser is configured to operate at from about ambient temperature to about 204 deg. C.

Aspect 54. The condensation train of any one of Aspects 45-53, wherein the second condenser is configured to operate at from about 16 deg. C. to about to about 54 deg. C.

Aspect 55. The condensation train of any one of Aspects 45-54, wherein the third condenser is configured to operate at from about 2 deg. C. to about 21 deg. C.

Aspect 56. The condensation train of any one of Aspects 45-54, wherein the third condenser operates at below ambient temperature.

Aspect 57. The condensation train of any one of Aspects 45-56, further comprising at least one of a knockout pot, a one seal pot, or a demister. As shown in FIG. 1, a knockout pot and/or a seal pot (136) can be in communication with the third overhead 134a.

Aspect 58. The condensation train of Aspect 57, comprising a knockout pot.

The vapor exit from the kiln is vertical and condensable vapors (along with non-condensable gas) move vertically upward out of the kiln. After traversing a distance, the vapors move downward to the quench tower through piping that is angled, e.g., at 45 degrees from vertical. Pipe diameters can be, e.g., about 14 to 16 inches in diameter to limit internal accretion by char and hydrocarbon vapor.

As the vapor transports through the piping, multiple hot nitrogen nozzles are energized to help keep the pipe walls clean. As the vapor enters the quench tower (also termed a spray down condenser or liquid-liquid exchange condenser or liquid-liquid heat exchanger), the diameter increases (e.g., to approximately 8 feet) to prevent accretion of material from occurring. Inside the quench tower a series of liquid spray nozzles, in a ring configuration, high in the quench tower spray downward, performing two functions.

1. Cooling of the hot hydrocarbon vapors entering the quench tower.
2. Knocking some of the entrained char out of the vapors, allowing it to settle at the bottom of the quench tower.

In an example embodiment, approximately 85%/wt of the condensable vapor is knocked out by the quench tower spray, and the condensed vapor (aka liquid hydrocarbon) is at approximately 121 deg. C. in the quench tower. The top layer of condensed liquid (at a distance from any of the char at the bottom) exits the quench tower and is split, with a portion going to the syncrude tank, and another portion (slipstream) optionally being sent to a decanter centrifuge, where it is cleaned. The slipstream that is cleaned at the decanter centrifuge is in a continuous loop with the quench tower, leading to improved quality (less particulate in the syncrude) of the syncrude over time. As shown in FIG. 1, element 146 is spray, used to cool and to remove particulate. Element 134b is optional; element 134b can also be combined with element 128, which combination stream is sent to element 160.

As shown, beyond the first condensing unit (122), there can be two additional condensers (126 and 132), which are tube-in-shell heat exchangers. The second condenser can use room temperature process water, the third condenser can utilize chilled water. Relative amounts of capture can be: quench tower, 85%/wt, first condenser, 10%/wt, second condenser, 5%/wt. The second and third tube-in-shell condensers can include liquid spray down systems to prevent fouling of the tubes (tubes are used for product, shell for cooling water). A knockout pot (optionally present) can capture additional condensable liquid. One can also (or instead) use a de-mister that includes a series of stainless steel pads that block the path of liquid to offer surface area for condensation.

Aspect 59. A method, comprising: communicating, to a first condenser, a feed that includes a vapor comprising a pyrolysis oil product, the first condenser optionally being a spray down condenser; operating the first condenser so as to give rise to a first liquid that comprises the pyrolysis oil product and a first overhead that comprises the pyrolysis oil product; recycling to the first condenser at least some of the first liquid; communicating the first overhead to a second condenser; operating the second condenser so as to give rise to a second liquid that comprises the pyrolysis oil product and a second overhead that comprises the pyrolysis oil product; communicating the second overhead to a third condenser; and operating the third condenser so as to give rise to a third liquid that comprises the pyrolysis oil product and to a third overhead that comprises noncondensed species.

Aspect 60. The method of Aspect 59, further comprising recycling at least some of the first liquid back to the first condenser and, optionally, cooling the first liquid.

Aspect 61. The method of Aspect 60, further comprising contacting the recycled first liquid to the feed vapor.

Aspect 62. The method of any one of Aspects 59-61, further comprising communicating pyrolysis oil product to the first condenser.

Aspect 63. The method of any one of Aspects 59-62, wherein the first condenser is configured to operate at from about ambient temperature to about 204 deg. C.

Aspect 64. The method of any one of Aspects 59-63, wherein the second condenser is configured to operate at from about 16 deg. C. to about deg. F. to about 54 deg. C.

Aspect 65. The method of any one of Aspects 59-64, wherein the third condenser is configured to operate at from about 2 deg. C. to about 21 deg. C.

Aspect 66. The method of any one of Aspects 59-64, wherein the third condenser operates at below ambient conditions.

Aspect 67. The method of any one of Aspects 59-66, further comprising (a) flaring the noncondensed species, (b) combusting the condensed species so as to heat a reactor train that generates the first overhead, or both (a) and (b).

Aspect 68. The method of any one of Aspects 59-67, wherein the first liquid comprises a char.

Aspect 69. The method of any one of Aspects 59-68, further comprising communicating any one or more of the first overhead, the second overhead, and the third overhead to a knockout pot, a seal pot, or a demister.

Aspect 70. The method of any one of Aspects 59-69, wherein the method is performed in a continuous manner.

Aspect 71. A separations train, comprising: a separation module, the separation module being configured to receive, optionally from a condenser, a feed material comprising a char and a pyrolysis oil product, the separation module being operable to separate the char and the pyrolysis oil from one another; a receiving line configured to receive pyrolysis oil product from the separation module.

Aspect 72. The separations train of Aspect 71, wherein the separation module is characterized as a decanter centrifuge.

Aspect 73. The separations train of Aspect 72, further comprising at least one filter configured to filter the feed material before the feed material enters the decanter centrifuge.

Aspect 74. The separations train of Aspect 71, wherein the separation module is characterized as a multiphasic decanter centrifuge.

Aspect 75. The separations train of Aspect 74, further comprising a source of separation liquid configured for communication to the multiphasic decanter centrifuge. Such separation liquid can be, e.g., water, or other liquid immiscible with pyrolysis oil.

Aspect 76. The separations train of Aspect 75, further comprising an outlet for separation liquid communicated to the multiphasic decanter centrifuge.

Aspect 77. The separations train of any one of Aspects 75-76, further comprising at least one filter configured to filter the feed material before the feed material enters the multiphasic decanter centrifuge.

Aspect 78. The separations train of any one of Aspects 71-77, further comprising a char receiving line configured to receive char from the centrifugal force separator.

Aspect 79. The separations train of any one of Aspects 71-78, wherein the receiving line is configured to place separated pyrolysis oil product into fluid communication with a collection location.

Aspect 80. The separations train of any one of Aspects 71-79, wherein the separations train is configured to recycle at least a portion of the feed material to a source of the feed material.

A decanter centrifuge is uniquely applied to pyrolysis applications; such units are typically used food processing/separation, wastewater cleanup, fish meal and fish oil separation, chemical extraction, clay and mineral processing, oil dewatering, fertilizer processing, etc. A decanter centrifuge being used for pyrolysis oil cleanup can use a second stream to enhance separation efficacy. Oil-containing char, from the bottom of the quench tower, can sent to the decanter centrifuge as a slipstream. Water is added to separate the oil and char particles. The slipstream feeding method can used to stay within the recirculating capability limits of the device. Multiple recirculations through the device can separate oil from the oily char, leaving behind a particulate-rich semi-solid component. The particulate-rich semi-solid component is separated from the water stream and hydrocarbon product stream. The semi-solid component has fuel value.

Aspect 81. A solid-liquid separations method, comprising: introducing, to a separation module, a feed comprising a pyrolysis oil product and a char, with the separation module, effecting separation of the pyrolysis oil product and the char fluid from one another; collecting the char; and collecting at least some of the pyrolysis oil product.

Aspect 82. The method of Aspect 81, wherein the source of the feed is a condenser.

Aspect 83. The method of Aspect 82, wherein the condenser is a spray down condenser.

Aspect 84. The method of any one of Aspects 81-83, wherein a portion of the feed from the condenser is recycled back to the condenser.

Aspect 85. The method of any one of Aspects 81-84, wherein the separation module is characterized as a decanter centrifuge.

Aspect 86. The method of Aspect 85, further comprising filtering the feed material before the feed material enters the decanter centrifuge.

Aspect 87. The method of Aspect 81, wherein the separation module is characterized as a multiphasic decanter centrifuge.

Aspect 88. The method of Aspect 87, further comprising communicating a separation liquid to the multiphasic decanter centrifuge.

Aspect 89. The method of Aspect 88, further comprising separating the separation liquid from the pyrolysis oil and char communicated to the multiphasic decanter centrifuge.

Aspect 90. The method of any one of Aspects 81-89, wherein the method is performed in a continuous manner.

Aspect 91. An operations unit, comprising: a first chamber; a second chamber; a conduit extending through the first chamber and into the second chamber, the conduit being at least partially enclosed by a conduit jacket, the conduit jacket defining an outer diameter, the conduit placing the second chamber into fluid communication with an environment exterior to the chamber, the second chamber comprising a wall facing the conduit jacket, and the second chamber being rotatable relative to the first chamber; a seal defining a boundary between the first chamber and the second chamber, the seal extending radially from the wall of the second chamber toward the conduit jacket, the seal comprising a first flange secured to and extending from the wall of the second chamber, the first flange defining an inner diameter, (a) the seal comprising a layered portion that comprises a plurality of ring-shaped portions, at least one of the ring-shaped portions having an inner diameter less than the outer diameter of the conduit jacket such that the at least one of the ring-shaped portions rotatably abuts the conduit jacket, the outer diameter of the conduit jacket optionally no more than about 1.25 cm larger than the inner diameter of the at least one of the ring-shaped portions, or (b) the seal comprising a brush that rotatably abuts the conduit jacket.

As described elsewhere herein, the second chamber can be a reactor or kiln, e.g., a rotatable drum or cylinder. The first chamber can, in some case, be viewed as a "catch basin" for byproduct or product produced in the second chamber, e.g., wax and/or char, that crosses the seal. Also as described elsewhere herein, the first chamber can be pressurized so as to achieve a positive pressure against material that can cross seal 204.

Aspect 92. The operations unit of Aspect 91, wherein the first flange comprises a plurality of portions. Without being bound to any particular theory or embodiment, the first flange can be formed from a single portion of material (e.g., a ring), but this is not a requirement. In some instances, the first flange can be formed of multiple portions of material, e.g., so as to allow for the flange to be constructed within the operations unit in the manner of a "ship in a bottle" approach. As but one example, the flange extending inwardly from the wall of the second chamber (which can be, e.g., a kiln) can comprise several curved sections that are arrayed circumferentially around the inner wall of the kiln and are welded to the inner wall of the kiln and also welded/sealed to one another.

Aspect 93. The operations unit of any one of Aspects 91-92, wherein the layered portion is attached to the first flange.

Aspect 94. The operations unit of any one of Aspects 91-92, further comprising a first washer, the first washer being attached to the first flange. The first washer can comprise metal or other refractory materials.

Aspect 95. The operations unit of Aspect 94, wherein the layered portion is attached to a first face of the first washer.

Aspect 96. The operations unit of Aspect 95, further comprising a second washer, the second washer being attached to second face of the first washer.

Aspect 97. The operations unit of Aspect 96, further comprising a fastener extending at least partially through the first washer, the layered portion, and the second washer.

Aspect 98. The operations unit of any one of Aspects 91-97, wherein the ring-shaped portion comprises steel, aluminum, brass, bronze, copper, carbon fiber, glass, a vermiculite on glass, or any combination thereof. A ring-shaped portion can comprise one or more woven structures or braided structures.

Aspect 99. The operations unit of any one of Aspects 91-98, wherein the layered portion comprises an alternating arrangement of ring-shaped portions.

Aspect 100. The operations unit of any one of Aspects 91-98, wherein the layered portion comprises a periodic arrangement of ring-shaped portions.

Aspect 101. The operations unit of any one of Aspects 91-100, wherein the layered portion comprises at least two ring-shaped portions having different moduli. In this way, a seal can exhibit the desired mechanical properties, e.g., stiffness, resilience, and flexibility. The layered portion of a seal can have a plurality of portions, which portions can be stacked together. Portions can be arranged in a periodic or repeating fashion, e.g., in an A-B-A-B-A-B fashion, an A-A-A-B-B-B fashion, or other arrangement suitable for the user's needs.

It should be understood that the ring-shaped portions of the layered portion can be of the same size (e.g., same inner diameter and same outer diameter), but this is not a requirement, as different ring-shaped portions of the layered portion can also themselves be of different sizes. The portions can be arranged such that the portions present a gradient within the thickness of the layered portion, e.g., a first ring-shaped portion that faces the second chamber can have a porosity that is higher than the porosity of a second ring shaped portion that is next to the first ring-shaped portion, and so on.

Without being bound to any particular theory, a seal according to the present disclosure can operate such that if the ring-shaped portions of the seal (which can be stacked) present extensive blockage (i.e., the inverse of percent open area or POA) and a multi-layer configuration is used, byproducts (e.g., wax and char) that impinge the face of the seal that faces the second chamber (as shown in FIG. 1 and FIG. 2) act to seal the seal. In this way, the byproducts can act to enhance the performance of the seal. Again without being bound to any particular theory, the final structure can, in some embodiments, be characterized as having less than about 10 POA.

Aspect 102. The operations unit of any one of Aspects 91-101, further comprising a source of pressurized fluid, the source in fluid communication with the second chamber. The source of pressurized fluid can be configured to encourage byproducts produced in the second chamber to remain in the second chamber. The pressurized fluid can be delivered via hoses, pipes, or a manifold.

An operations unit can also include a source of pressurized fluid (e.g., nitrogen) that is configured to give rise to a positive pressure in the first chamber (element 220 in FIG. 2 and FIG. 3). Such a positive pressure can thus discourage byproduct material from the second chamber from crossing through seal 204 and then entering into first chamber 204.

Aspect 103. The operations unit of Aspect 102, wherein the fluid comprises a noble gas. Argon and helium are considered especially suitable.

Aspect 104. The operations unit of Aspect 102, wherein the fluid comprises nitrogen gas. A fluid can also include a hydrocarbonaceous vapor.

Aspect 105. The operations unit of any one of Aspects 91-104, further comprising a pressure transducer configured to detect a pressure within the first chamber.

Aspect 106. The operations unit of any one of Aspects 91-105, further comprising a pressure transducer configured to detect a pressure within the second chamber. Without being bound to any particular theory, a pressure transducer can be used as part of a pressure maintenance train that can effect a positive pressure in the first chamber, which positive pressure can (as explained elsewhere herein) discourage byproduct material from the second chamber from crossing through seal 204 and then entering into first chamber 204. A pressure transducer can also monitor the pressure within the second chamber, and the reading from such a pressure transducer can in turn be used to modulate the pressure within the second chamber, e.g., via opening a valve and/or actuating a pump so as to reduce a pressure within the second chamber.

Aspect 107. The operations unit of any one of Aspects 91-106, further comprising a pump configured to reduce a pressure within the second chamber.

Aspect 108. The operations unit of any one of Aspects 91-107, further comprising a motor configured to rotate the second chamber.

Aspect 109. The operations unit of any one of Aspects 91-108, further comprising a circumferentially rotatable joint configured to support rotation of the second chamber. Without being bound to any particular theory, such a joint can be a rotatable, face-to-face, double O-ring joint. A joint can include bearings, in some instances.

Also without being bound to any particular theory or embodiment, an operations unit can include a source of pressurized fluid (e.g., nitrogen) that is configured to be exerted against the joint in which a way that the pressurized fluid discourages leaks through the rotatable joint.

Aspect 110. The operations unit of Aspect 109, further comprising a source of a source of pressurized fluid in fluid communication with the circumferentially rotatable joint.

Aspect 111. The operations unit of Aspect 110, wherein the fluid comprises a noble gas.

Aspect 112. The operations unit of Aspect 110, wherein the fluid comprises nitrogen gas. The fluid can also comprise a hydrocarbonaceous vapor.

Aspect 113. The operations unit of any one of Aspects 91-112, wherein the second chamber is configured as a rotatable kiln reactor.

Aspect 114. The operations unit of Aspect 113, wherein the second chamber comprises one or more of chains, lifters, or screw flights.

Aspect 115. The operations unit of any one of Aspects 91-114, wherein the seal comprises a layered portion that comprises a plurality of ring-shaped portions, at least one of the ring shaped-portions having an inner diameter less than the outer diameter of the conduit jacket such that the at least one of the ring-shaped portions rotatably abuts the conduit jacket.

Aspect 116. The operations unit of any one of Aspects 91-115, wherein the first chamber is defined by an interference-fit joint that is expandable in response to temperature within the first chamber, within the second chamber, or both. As shown in FIG. 1, interference fit joint 226 can accommodate temperature-related expansion by one or both of the surfaces that make up the joint. In this way, leaks related to temperature-caused expansion of a joint can be moderated, as the joint retains at least some of its sealing ability even in the face of temperature expansion. By having an enclosure arrangement that accommodates thermal expansion, the disclosed operations units can operate at industrial temperatures without compromising performance or exhibiting undesirable levels of leaking.

Aspect 117. The operations unit of any one of Aspects 91-116, further comprising a portion of fabric (which can be termed a "bellows") that at least partially encloses the first chamber. As shown in FIG. 2, fabric 228 can at least partially enclose first chamber 220. The fabric can be pervious, but this is not a requirement. In some instance, the fabric can be removable so that byproduct that has crossed seal 204 and accumulated within first chamber 220 and/or in seal 204 can be collected and the fabric (or a replacement fabric) can be re-installed. Alternatively, a user can periodically clean out the bellows on a scheduled or on an as-needed basis.

Aspect 118. A method, comprising operating an operations unit according to any one of Aspects 91-117.

Aspect 119. The method of Aspect 118, wherein the operating is performed so as to pyrolyze a hydrocarbonaceous material. Such a material can be, e.g., a plastic, a rubber, and the like.

What is claimed:

1. A system for conversion of organic polymeric material to hydrocarbonaceous materials, comprising:
a thermal cracking train,
the thermal cracking train configured to effect molecular cracking of a polymeric material fed to the thermal cracking train so as to give rise to a thermal cracking product of the polymeric material;
a condensing train,
the condensing train comprising a first condenser, a second condenser, and a third condenser,
the first condenser configured to receive the thermal cracking product from the thermal cracking train and (a) output an overhead and (b) output a bottoms that comprises a first liquid, the first liquid comprising (i) solid material and (ii) a pyrolysis oil constituent,
the second condenser configured to (a) receive the overhead of the first condenser and (b) output an overhead and a bottoms, and
the third condenser configured to receive the overhead of the second condenser; and
a separating train,
the separating train configured to receive the first liquid from the first condenser of the condensing train,
the separating train being configured to separate at least some of the solid material from the first liquid so as to give rise to a purified pyrolysis oil output product,
the system configured to output a product stream that comprises the purified pyrolysis oil output product,
wherein the first condenser effects contact between (1) a recycled portion of the bottoms of the first condenser that is recycled to the first condenser and (2) thermal cracking feed received by the first condenser from the thermal cracking train, and
wherein the first condenser is free of material recycled to the first condenser from the second and third condensers.

2. The system of claim 1, wherein the thermal cracking train is configured to expose the polymeric material to a plurality of temperature zones.

3. The system of claim 1, wherein the thermal cracking train is configured to devolatilize a char derived from cracking of the polymeric material.

4. The system of claim 1, wherein the thermal cracking train comprises a reactor defining a reaction chamber having a length and being operable to have a plurality of temperature zones along the length of the reaction chamber.

5. The system of claim 1, wherein the first condenser is configured as a direct contact condenser.

6. The system of claim 1, wherein the bottoms of the second condenser is a condensed pyrolysis oil product and wherein the overhead of the second condenser is a noncondensed overhead.

7. The system of claim 6, wherein the third condenser is configured to produce, from the noncondensed second overhead, a noncondensed product and a condensed light product.

8. The system of claim 7, wherein the thermal cracking train is configured to combust the noncondensed product so as to generate heat used in the thermal cracking train.

9. The system of claim 1, wherein the separating train comprises at least one of a centrifuge, a decanter centrifuge, or a multiphasic decanter centrifuge.

10. The system of claim 1, wherein the system is configured to combine the condensed pyrolysis oil product of the second condenser and the purified pyrolysis oil output product so as to give rise to the product stream.

* * * * *